Feb. 12, 1952  O. B. SUTTON  2,585,514

TOASTER TIMING MECHANISM

Filed May 21, 1949  2 SHEETS—SHEET 2

INVENTOR.
Otis B. Sutton

BY Harry S. Dumasse
ATTORNEY.

Patented Feb. 12, 1952

2,585,514

UNITED STATES PATENT OFFICE 2,585,514

TOASTER TIMING MECHANISM

Otis B. Sutton, Canton, Ohio, assignor to The Hoover Company, North Canton, Ohio, a corporation of Ohio Application May 21, 1949, Serial No. 94,567

21 Claims. (Cl. 161—1)

1

The present invention relates to the art of toasting devices and particularly to a bread toasting mechanism embodying a novel timing means which is a further development of the timing mechanism disclosed and claimed in the application of Anthony D. Horvath, Serial No. 719,351 filed December 31, 1946, and assigned to the assignee of this application.

It has long been an acute problem in the design of bread toasting devices to provide a thermal timing mechanism which will decrease the time period of succeeding toasting periods by the correct amount. If the toaster is operated successively in close time sequence, most thermostatic mechanisms tend to over-compensate, that is, to shorten up closely succeeding toasting timing intervals by too great an amount so that the toast produced is progressively lighter and lighter in color. The foregoing problem has been aggravated by the fact that thermostats having sufficient mass to heat at a rate slow enough to time the toasting period adequately have heat dissipating capacity insufficient to cool to a significant degree in the intervals between succeeding toasting periods. It is not practical to provide direct heat dissipating area on the thermal element because such heat dissipating area will then itself have to be heated to the operating temperature of the thermostat and will as a result also introduce additional mass to be cooled in the intervals between closely succeeding toasting operations.

It is a principal object of the present invention to provide a toaster timing mechanism having a large heat dissipating area active at all times but which is so arranged that it does not operate at the high operating temperature of the thermal element itself.

It is a further object of the present invention to provide a thermal timing mechanism for bread toasters in which the major timing effect is measured by the time required to vaporize a measured quantity of a volatile liquid.

It is a further important object of the present invention to provide a toaster timer characterized by the provision of a vaporization-condensation cooling system which times the toasting operation and which also quickly dissipates the heat of the thermal element to a very large heat dissipating area in the intervals between succeeding toasting operations.

It is an object of the present invention to provide a liquid type thermal timing mechanism for a toaster in which the liquid is progressively heated and then cooled during a toasting opera-

2 tion so as to be available in a comparatively cool state to cool the thermal element at the termination of a toasting operation.

Other objects and advantages of the invention will become apparent as the description proceeds when taken in connection with the accompanying drawings in which.

Figure 1:
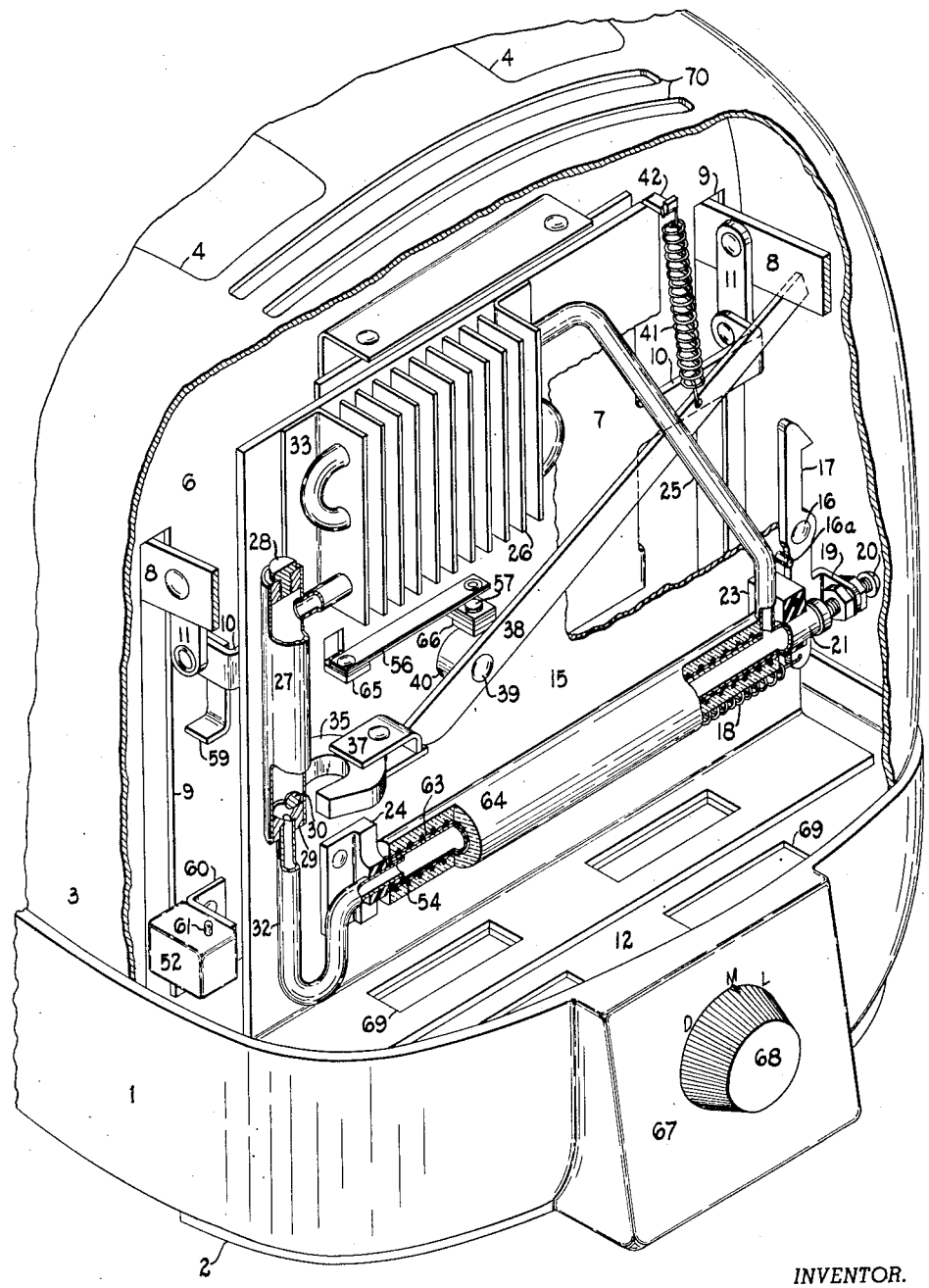
Figure 1 is a perspective view partly in section showing an end of a bread toasting mechanism embodying the present invention.
Figure 2:
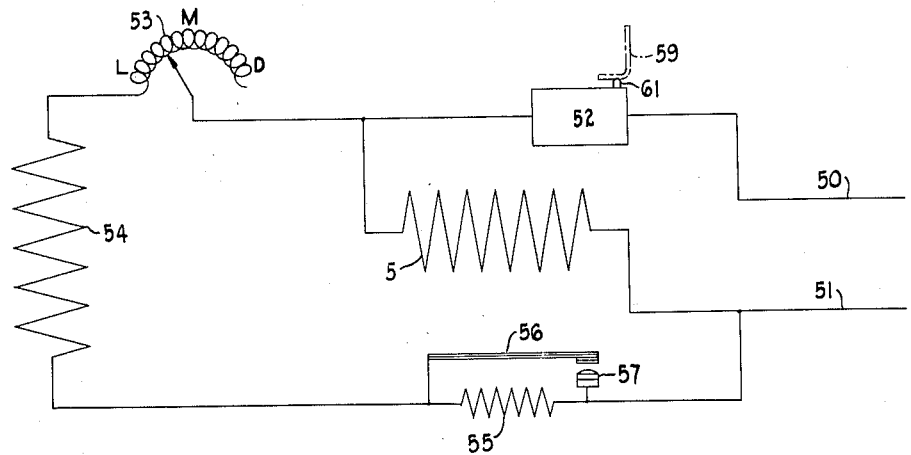
Figure 2 is a schematic wiring diagram of the electrical parts associated with the mechanism of Figure 1.

Referring now to the drawing in detail and first to Figures 1 and 2 thereof, there is shown a toaster comprising a base portion 1 preferably constructed of a plastic material which is both a heat and an electrical insulator. The base 1 is provided with projecting supporting feet 2 to allow free access of cooling air to the underside thereof for a purpose to be described in detail hereinafter. A cover and appearance shell 3 rests upon the base 1 and covers the toasting mechanism proper. The shell 3 is provided with the usual bread receiving slots 4 which provide access to toasting ovens, not shown, within the shell 3. The usual electric heaters, indicated at 5 in the electrical diagram of Figure 2, are provided within the oven underlying the slots 4. The ovens are separated from the end wall of the shell by a partition wall 6 to provide a control chamber between the wall 6 and the end wall of the shell 3.

It is conventional in toasters of the general type to which my invention relates to provide movable bread supporting carriages within the toasting oven. These carriages are conventionally supported by a slide plate indicated generally at 7 and are lowered against the bias of a tension spring by the side arms 8 which pass through slots 9 on opposite sides of the wall 6. Conventionally the arms 8 are pivoted at the opposite end of the toaster and curve around the inside end wall of the shell 3 to a central vertical slot through which they pass to join an actuating handle. These mechanisms are conventional hence they are not illustrated in detail herein. The slide plate 7 is provided with outwardly projecting arms 10 which are pivotally connected to links 11 pivoted on the carriage operating links 8.

The toaster control mechanism is associated with a control supporting plate 15 positioned in spaced relation to the wall 6 and the end wall of the cover shell 3 of the toaster mechanism. Plate 15 is secured to and supported by the bottom frame plate 12 of the toaster structure. A latch 17 is pivotally mounted on the plate 15 by means of a pin 16 in position to engage over the right hand carriage operating link 8 as shown in Figure 1. The latch 17 is urged in clockwise direction, as viewed in Figure 1 against a fixed stop 16a by means of the tension spring 18, one end of which is secured to the latch and the other end of which is pivotally anchored to the plate 15. The latch 17 carries a forwardly projecting lug 19 in which is mounted an adjusting screw 20. The adjusting screw 20 is set to be engaged by a thermal element 21, to be described more fully hereinafter, when that element is heated to a predetermined temperature. When the carriage actuating arm 8 is lowered it engages the tapered upper edge of the latch 17 and then snaps under the hooked end thereof which serves to secure the carriage arm 8 and the toast supporting rack in lowered toasting position.

The thermal element 21 consists of an elongated tube preferably constructed of metal having a high coefficient of thermal expansion. The end of the tube 21 adjacent the latch 17 is slideably mounted in an insulating block 23 projecting outwardly of the plate 15. The other end of the thermal element 21 is fixedly mounted in a supporting plate 24 carried by and projecting outwardly of the plate 15. The end of tube 21 adjacent the latch 17 communicates with a small conduit 25 extending to the upper portion of the plate 15 wherein it has a number of return bend portions piercing a plurality of heat dissipating fins 26 to form a condenser. After the tube 25 has traversed the fins 26 it opens into a reservoir vessel 27 mounted adjacent the side of the toaster opposite to the latch 17. The upper portion of the vessel 27 is provided with a screw fitted charging plug 28 through which a suitable cooling medium such as methylene chloride Carrene can be charged to the cooling system. The lower portion of the reservoir 27 is closed by a valve plug 29 hollowed out interiorly to an inverted cone shape to form a seat for a ball valve 30. The central portion of the valve seat 29 is open in the usual manner and communicates with a conduit 32 which opens into the fixedly mounted end of the thermostat tube 21 thus forming a complete fluid circuit including the reservoir, the condenser and the interior of the thermal element.

The end fins of the condensing structure are provided with laterally turned flanges 33 which are secured to the face of the supporting plate 15 to provide secure support for the condenser structure.

The ball valve 30 is operated by means of a permanent magnet 35 positioned exteriorly of the reservoir 27. In the position shown the magnet is adjacent the valve plug 29 and has attracted the magnetic ball valve 30 to the side of the reservoir 27 thus uncovering the opening in the valve seat 29 to allow cooling medium to flow from the reservoir into the thermal element 21 through conduit 32.

The permanent magnet is secured by means of a clamp 37 to the end of a lever 38 which is pivotally mounted by means of a pin 39 on a boss 40 which projects outwardly of the face of the plate 15. The projecting end of the lever 38 underlies one of the carriage operating links 8 as clearly shown on the right hand side of Figure 1. A tension spring 41 mounted between a lug 42 on the plate 15 and the lever 38 constantly biases the same in a counterclockwise direction against the carriage link 8. When the toast carriage mechanism is lowered to toasting position the carriage link 8 rotates the lever in a clockwise direction against the bias of the spring 41 and removes the permanent magnet 35 from the vicinity of the ball valve 30 which then rolls into the concavity in the valve seat 29 closing the passage therethrough and interrupting further flow of cooling medium from the reservoir 27 into the conduit 32 and thermal element 21. In this connection it is noted that magnet 35 is not powerful enough to lift the ball valve 30 as the magnet rocks to its upper toasting position. When the carriage is released, in a manner to be described hereinafter, at the termination of a toasting operation, the carriage links rise to the elevated toast ejecting position shown and the spring 41 rocks the lever 38 into the position shown which then attracts the ball valve away from its seat in the valve element 29 to open the passage from the reservoir to the thermal element.

Referring now to Figure 2, a schematic wiring diagram of the electrical parts of the apparatus is illustrated. The electrical connections for these parts are omitted from Figure 1 for clarity of illustration. The main heating element 5 for the toasting oven is connected across the electrical supply lines 50 and 51 in series with a normally open circuited main control switch 52. The main control switch 52 is also connected in series circuit relation with a control rheostat 53, a heater 54 for the thermal element 21 and a current limiting resistor 55. A thermostatic switch structure comprising a bimetallic contact carrying arm 56 and a stationary contact 57 is shunted around the resistor 55. It is obvious from Figure 2 that the switch 52 controls the energization of all electrical parts of the apparatus.

The normally open circuit switch 52 is mounted on a bracket 60 carried by the partition wall 6 adjacent the bottom plate 12 of the toaster. The switch includes an operating pin 61 projecting upwardly therefrom in position to be engaged by a presser foot 59 depending from one of the arms 10 on the carriage slide. The parts are so arranged that the switch is moved to closed circuit position by the presser foot 59 when the toast carriage operating links 8 are latched in lower, toasting position.

That portion of the expansible tube 21 between the supporting brackets 23 and 24 is covered with a sheet of insulating material 63 around which the heating element 54 is wrapped so as to provide good thermal conductivity between the wires of the heating element and the tube 21 while insulating the tube electrically from the wire. The whole assembly is then encased in a sheet of electrical and heat insulating material 64.

The bimetallic element 56 of the short circuiting thermal switch for the current limiting resistor 55 is secured to a tab 65 struck out of the plate 15. The stationary contact 57 of this switch is secured to a tab 66 struck out of the plate 15. The resistor 55 is not shown in Figure 1, however, it may be located beneath the plate 12 or at any other convenient location in the toaster. The rheostat 53 is preferably mounted in the projecting portion 67 of the base 1 and is operated by a manually operated dial 68 which is positioned on the exterior of the projection 67. The current limiting rheostat is a conventional arrangement in which rotation of the dial 68 varies the amount of rheostat resistance in the series circuit relation with the heating element 54 to control the current flow therethrough.

Large openings 69 are formed in the bottom plate 12 of the toaster between the supporting panel 15 and the end of the cover shell 3 to provide for free flow of cooling air from underneath the toaster structure into the control chamber. That portion of the cover shell 3 overlying the control chamber is provided with suitable louvers 70 to allow free escape of heated air.

The operation of the device is as follows: Assuming that the toaster is cold, the parts will be in the position shown in Figure 1 with the magnet 35 attracting to the ball valve 30 away from its seat to allow the fixed charge of liquid cooling medium to collect in the hollow expansible tube 21. Bread to be toasted is inserted in the slots 4 after which the toast carriage is lowered until the latch 17 engages over the right hand carriage link 8 to hold the toast carriage in lower toasting position against the bias of the carriage lifting spring. With the carriage in this position the magnet is removed from the vicinity of the ball valve which then closes and the presser foot 59 has operated the switch 52 to close circuit position to energize the heating element for the oven and the series circuit including resistor 53, the thermal tube heater 54 and the resistor 55. Since the chamber housing the control element is cold at this time, the bimetallic strip 56 will be flexed upwardly to open the circuit at the contact 57 hence the resistor 55 is active to limit the current through the resistor 54. Immediately the heater 54 is energized it begins to apply heat to the thermal element and its contents and after a short period of time will have raised the cooling medium to the boiling point which is well below the latch releasing temperature of the element 21. From this point on the cooling medium simply vaporizes and the resulting vapor flows through conduit 25 into the finned portion thereof which acts as a condenser. The vapor is thus reduced to the liquid state and collects in the reservoir 27. Cooling air flows through the openings 69 and over the fins 26 to pick up the heat of condensation of the cooling medium supplied in vapor form to the condenser. The vaporization of cooling medium continues until the entire charge in the boiler is exhausted whereupon the temperature of the expansible tube rises rapidly causing the tube to expand sufficiently to operate the latch 17 which releases the carriage arm 8 and allows the parts to return to the position illustrated in Figure 1 which is the de-energized non-toasting position of the apparatus. It is preferred to relate the heat capacity of the thermal element 21 and the heating rate of heater 54 so that the thermal element is heated very rapidly to its operating temperature when the liquid charge has been boiled away. During the initial toasting period the resistor 55 is in circuit to limit the current through the auxiliary heater 54 so as to lengthen the toasting cycle sufficiently to compensate for the initial cold condition of the oven. Immediately the toasting period is ended the magnet 35 attracts the ball valve which allows the entire collected charge of liquid cooling medium to dump into the hot thermal tube. As a result of this action a portion of the medium is flashed into vapor serving to cool the tube down to the ambient temperature within the control chamber. Vapor formed during this period is condensed and immediately flows back into the thermal tube. Due to the relatively enormous heat dissipating area presented by the fins 26 compared with the quantity of heat to be rejected from the expansible tube, the tube is very quickly cooled so that the apparatus is ready to be recycled within a few seconds after termination of a toasting operation. If the apparatus is immediately recycled to produce another toasting operation the oven will start in hot condition, but the ambient temperature within the control chamber will also be raised sufficiently to operate thermostat 56 to close circuit position which shunts the current limiting resistor 55 out of operation. Whenever a toasting operation is started with a hot oven the cooling medium will be substantially at the vaporization temperature corresponding to the ambient temperature within the control chamber so that there will be no initial delay period represented by the time required to bring the liquid contents of tube 21 to a vaporizing temperature. Therefore, the second toasting operation will be shorter than the first which is a desirable condition because it requires less time to produce any given color of toast if the oven is initially hot. Toasters characteristically increase their average ambient for several successive toasting cycles requiring successive shortening of the toasting period to produce toast of uniform quality. The present invention accomplishes this automatically in that the increasing temperature of the parts in the control chamber tend to cause an increase in the rate of air flow therethrough and an increase in the differential temperature between the fins 26 and cooling air flowing into the bottom of the chamber resulting in increasingly rapid boiling of the cooling medium in the thermal tube which tends to shorten up the duration of the toasting operation.

It is to be noted in the above described operation of the invention that a very large heat dissipating area is effective to remove heat from the thermal element proper during the major portion of a toasting operation and in fact it is the time required to vaporize a measured quantity of liquid which determines the duration of a toasting operation. In the intervals between the time in which the thermal element boils dry and expands sufficiently to actuate the carriage release latch, the temperature of the thermal element increases significantly while the temperature of the heat dissipating element decreases to some extent and additional vapor is converted to the liquid phase. At the moment a toasting operation is terminated there is a large temperature differential between the condenser of the cooling system and the tube 21 which is quickly equalized by boiling of a part of the liquid charge which dumps into the thermal element at the termination of a toasting operation. The large area heat dissipating element dissipates heat from the thermal element at the termination of a toasting operation to reduce the temperature of the same with great rapidity in order that it may immediately be available to time a succeeding toasting operation.

Figure 3:
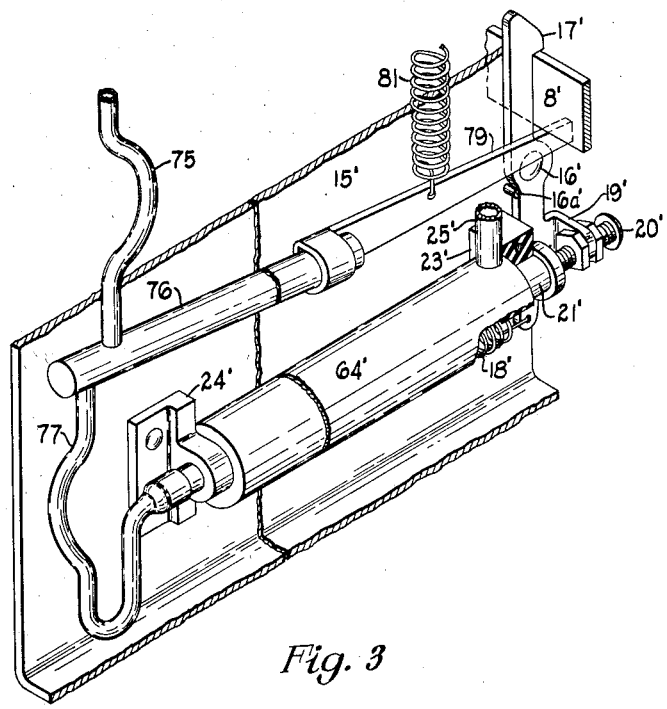
Figure 3 is a perspective view of a modification of the timing mechanism of Figure 1.

Referring now to Figure 3, a modified form of the invention is illustrated. This form of the invention is identical with that described in connection with Figures 1 and 2 in all respects except the means by which flow of cooling medium into the thermal element is prevented during toasting operation, therefore, only those portions of the apparatus of Figure 3 which differ from that of Figure 1 are illustrated. Parts of the apparatus shown in Figure 3 which are identical with corresponding parts of the apparatus illustrated in Figure 1 are given the identical reference characters distinguished by the addition of a prime.

In this form of the invention the reservoir 27, the ball valve 30, the magnet 35 and its supporting mechanisms 36, 38, 39 and 40 as well as the tension spring 41 are omitted.

In this form of the invention the condensate formed in the condenser flows through a curved flexible conduit 75 into a reservoir vessel 76. The conduit 75 joins the reservoir 76 in spaced relation to its left hand end as viewed in Figure 3. A curved flexible conduit 77 is connected between the thermal tube 21' and the lower part of the reservoir 76 to the left of its connection to the conduit 75. Conduit 77 also includes a generally U-shaped portion so as to form a liquid filled gas sealing trap at its lower end corresponding in function to the trap portion of the conduit 32 of Figure 1.

The end of the reservoir 76 which is remote from its point of connection to the conduits 75 and 77 is rigidly secured to an operating arm 79 which extends into the path of movement of the right hand toast carriage operating link 8'. As shown in Figure 3, the parts are in the position which they assume during toasting operation. In this condition the carriage operating link 8' has operated the arm 79 to pivot the reservoir 76 on flexible conduits 75 and 77 so that the right hand end of the reservoir 76 is lower than its left hand end. In the position shown, condensate flowing through the conduit 75 from the condensing mechanism flows into the reservoir 76 and collects in the right end thereof. After the thermal element 21' is boiled dry its temperature rapidly increases causing the same to expand and to operate the latch 17' through the adjusting nut 20' and the lug 19' on the latch to release the toast carriage and terminate toasting operation. When the carriage link 8' is released it moves upwardly out of contact with the arm 79. A tension spring 81 anchored between the arm 79 and a fixed portion of the frame plate 15' flexes the reservoir 76 about the flexible conduits 75 and 77 to raise right hand end thereof above the level of its connection to the conduit 77 which dumps the accumulated charge of cool condensate into the thermal element 21' whereby the same is cooled approximately to the temperature in the control compartment. Any vapor produced by cooling the thermal element 21' flows through the conduit 25' to the condensing mechanism where it is liquefied and then flows back through the conduit 75 into the reservoir 76 and conduit 77 so that the thermal mechanism is immediately ready to time a succeeding toasting operation with a full charge of volatile media in the hollow thermal element.

This form of the invention operates in principle exactly the same as that described in connection with Figure 1, however, in place of internal moving parts and the movable magnet of Figure 1, the present apparatus uses a tiltable reservoir which is mounted on flexible conduits 75 and 77 so as to shift the same from an operating, toasting position in which all liquid discharged from the condensing mechanism accumulates therein into a non-toasting position in which any liquid reaching the reservoir immediately flows through the conduit 77 into the thermal control element itself.

It is characteristic of both forms of the invention herein disclosed that the major portion of the toasting operation is determined by the time required to volatilize a substantially fixed charge of a volatile liquid. Since the boiling temperature of the liquid is determined by its own thermal characteristics and the very large heat dissipating capacity of the condensing structure, this part of the timing operation will proceed at a comparatively low temperature. Despite the low temperature at which this part of the timing operation proceeds it does not rush to completion at an undesirably great rate because the auxiliary heating element for the thermal mechanism must at this time supply latent heat rather than sensible heat to the timing mechanism. As the volatile medium is vaporized in the thermal element it immediately travels to a region of lower temperature wherein it rejects the latent heat imparted thereto and some of its sensible heat and is then collected in a reservoir, also undergoing cooling, to be ready for a succeeding timing operation. Once the boiler is dry a comparatively small quantity of heat is all that is required to raise its temperature to a degree sufficient to operate the toasting release mechanism. Immediately the toasting operation is completed a large quantity of cool liquid is dumped into the thermal element which flash cools the same almost instantaneously but immediately utilizes the very large heat dissipating area of the condensing mechanism to dissipate this heat so that the volatile medium again flows back into the thermal element.

Stated somewhat differently the present apparatus is characterized by a structure in which the major portion of heat supplied to the thermal element during a timing operation is dissipated from a very large heat rejecting area device during the timing operation and in which the large area heat dissipating device operates between timing operations to reduce the temperature of the thermal element almost instantaneously to a value such that it is immediately conditioned properly to time a succeeding toasting operation.

While I have illustrated and described the invention in considerable detail, it is to be understood that various changes may be made in the arrangement, proportion and construction of parts without departing from the spirit of the invention or the scope of the appended claims.

I claim:

1. In a cooking device, an oven, means for heating said oven, a timing mechanism including a thermally responsive device in heat exchange with a volatile cooling medium, a second means for heating said device and said volatile cooling medium, a condenser and liquid receiver structure arranged to condense vapor of cooling medium driven off by said second heating means and to return the condensed cooling medium into heat exchange with said device, timing period initiating means arranged to activate both of said heating means to initiate a cooking operation, means arranged to be operated by said thermally responsive device responding to a temperature condition above the boiling temperature of said cooling medium to de-activate both of said heating means to terminate a cooking operation, and means operated by said initiating means to block flow of liquid cooling medium from said receiver into heat exchange relation with said thermally responsive device for the duration of a cooking operation.

2. In a cooking device, an oven, means for heating said oven, a timing mechanism including a thermally responsive device in heat exchange with a volatile cooling medium, a second means for heating said device and said volatile cooling medium, a condenser and liquid receiver structure arranged to condense vapor of cooling medium driven off by said second heating means and to return the condensed cooling medium into heat exchange with said device, timing period initiating means arranged to activate both of said heating means to initiate a cooking operation, means arranged to be operated by said thermally responsive device responding to a temperature condition above the boiling temperature of said cooling medium to de-activate both of said heating means to terminate a cooking operation, means operated by said initiating means to block flow of liquid cooling medium from said receiver into heat exchange relation with said thermally responsive device for the duration of a cooking operation, and a control chamber housing said control mechanism and means providing for flow of cooling air through said chamber to cool said condenser.

3. In a cooking device, an oven, electrical means for heating said oven, a timing mechanism including a thermally responsive device in heat exchange with a volatile cooling medium, a second electrical means for heating said device and said volatile cooling medium, a condenser and liquid receiver structure arranged to condense vapor of cooling medium driven off by said second heating means and to return the condensed cooling medium into heat exchange with said device, timing period initiating means arranged to activate both of said heating means to initiate a cooking operation, means arranged to be operated by said thermally responsive device responding to a temperature condition above the boiling temperature of said cooling medium to de-activate both of said heating means to terminate a cooking operation, means operated by said initiating means to block flow of liquid cooling medium from said receiver into heat exchange relation with said thermally responsive device for the duration of a cooking operation, a control chamber housing said control mechanism and means providing for flow of cooling air through said chamber to cool said condenser, and a current limiting resistor in series with said second heating means and temperature responsive means for shunting said resistor when the temperature in said control chamber exceeds a predetermined value.

4. In a toaster, a timing mechanism comprising a tubular thermally expansible element, means for heating said element, a fluid circuit charged with a volatile fluid including said tubular element and a condenser receiver structure connected to condense cooling medium vapors evolved in said tubular element and to return condensed cooling medium thereto, timing period initiating means for energizing said heating means and for interrupting the flow of cooling medium from said condenser receiver structure to said tubular element, and timing period terminating means arranged to be operated by said thermally responsive element when heated to a predetermined temperature above the maximum temperature to which it will heat when in heat exchange with liquid cooling medium.

5. In a toaster, a timing mechanism comprising a fluid circuit charged with a volatile cooling medium and including a boiler element, a condenser connected to receive vapor evolved in said boiler, and means including fluid flow control means for conducting condensed cooling medium from said condenser to said boiler; means for heating said boiler element, means for energizing said heating means and for operating said flow control means to prevent flow of cooling medium from said condenser to said boiler element to initiate a timing period, and means operative in response to the thermal condition of said boiler after the same has boiled dry of cooling medium for de-energizing said heating means and for operating said flow control means to allow cooling medium to flow from said condenser to said boiler.

6. Apparatus according to claim 5 in which said flow control means comprises a movably mounted reservoir having an outlet connection adjacent one end thereof and said timing period initiating and terminating means move said reservoir so that the major portion thereof is below and above said outlet connection respectively.

7. Apparatus according to claim 5 in which said flow control means comprises a magnetic valve element within said fluid circuit biased to flow interrupting position, and a magnetic means external to said fluid circuit operated by said timing period terminating and initiating means to attract said valve element to fluid flow permitting position and to release said valve element from external magnetic influence, respectively.

8. In a toaster, a timing mechanism comprising a fluid circuit charged with a volatile cooling medium and including a boiler element, a condenser connected to receive vapor evolved in said boiler, and means including fluid flow control means for conducting condensed cooling medium from said condenser to said boiler; means for heating said boiler element, means for energizing said heating means and for operating said flow control means to prevent flow of cooling medium from said condenser to said boiler element to initiate a timing period, means operative in response to the thermal condition of said boiler after the same has boiled dry of cooling medium for de-energizing said heating means and for operating said flow control means to allow cooling medium to flow from said condenser to said boiler, and thermostatic means for increasing the heating rate of said heating means when the ambient temperature adjacent said condenser exceeds a predetermined value.

9. A toaster comprising a casing, a partition in said casing defining the common boundary of a toasting oven and a control chamber, spaced openings in said casing opening into said control chamber to provide for flow of cooling air therethrough, a timing mechanism in said chamber comprising a fluid circuit charged with a volatile cooling medium and including a boiler element and a tubular finned condenser connected to receive cooling medium vapor from said boiler positioned in the upper portion of said chamber positioned to be traversed by cooling air flowing therethrough and a fluid flow control element connected to control flow of liquid cooling medium from said condenser to said boiler, means for heating said boiler element, means for energizing said heating means and for operating said flow control means to prevent flow of cooling medium from said condenser to said boiler to initiate a timing period, means operative in response to the thermal condition of said boiler after the same has boiled dry of cooling medium for de-energizing said heating means and for operating said flow control means to allow cooling medium to flow from said boiler to said condenser.

10. In a toaster a timing mechanism including a thermal element, means for heating said thermal element, means operable by said thermal element when said thermal element is heated to a predetermined temperature for de-energizing said heating means to terminate a timing operation, a heat dissipating system arranged to abstract heat from said thermal element for the major portion of a timing period at a rate sufficient to maintain the temperature of said thermal element below said predetermined value, said heat dissipating system including parts removed from the vicinity of said heating means for dissipating heat abstracted from said thermal element as such heat is applied thereto during a timing operation.

11. In a toaster a timing mechanism including a thermal element, means for heating said thermal element, means operable by said thermal element when said thermal element is heated to a predetermined temperature for de-energizing said heating means to terminate a timing operation, a heat dissipating system associated with said thermal element including a heat dissipating part removed from the vicinity of said heating means and said thermal element, said system including means for conveying a predetermined amount of heat from said thermal element to said heat dissipating part at a rate sufficient to maintain the temperature of said thermal element below said predetermined value until said amount of heat is removed and to remain ineffective to transfer heat from said thermal element until the termination of the timing operation.

12. In a toaster a timing mechanism including a thermal element, means for heating said thermal element, means operable by said thermal element when said thermal element is heated to a predetermined temperature for de-energizing said heating means to terminate a timing operation, a vaporization-condensation heat dissipating system associated with said thermal element charged with a volatile liquid, said system including means for passing a predetermined quantity only of said liquid into heat exchange with said thermal element during any single timing operation, and an air cooled condenser connected to receive vapor of said liquid vaporized by heat abstracted from said thermal element.

13. In a toaster a timing mechanism including a thermal element, means for heating said thermal element, means operable by said thermal element when said thermal element is heated to a predetermined temperature for de-energizing said heating means to terminate a timing operation, a vaporization-condensation heat dissipating system associated with said thermal element charged with a volatile liquid, said system including means for passing a predetermined quantity only of said liquid into heat exchange with said thermal element during any single timing operation, an air cooled condenser connected to receive vapor of said liquid vaporized by heat abstracted from said thermal element, and means operative at the termination of a timing operation to render said liquid quantity limiting means ineffective to permit said system to cool said thermal element without restraint between timing operations.

14. A toaster timer mechanism including a thermal element, means for heating said element, a heat dissipating system arranged to dissipate heat applied to said thermal element during a timing operation including a flow control means for a volatile liquid coolant connected to conduct liquid coolant into heat exchange with said thermal element, a heat dissipating element removed from the direct influence of said heating means and connected to receive coolant vapor produced by heat applied to said thermal element and to discharge condensed coolant to said flow control means, means for energizing said heating means and for operating said flow control means to prevent further flow of coolant into heat exchange with said thermal element to initiate a timing operation, and means operable by said thermal element when heated to a predetermined temperature for de-energizing said heating means and for operating said flow control means to resume flow of coolant into heat exchange with said thermal element.

15. Apparatus according to claim 14 in which said flow control means comprises a liquid receiver connected to receive condensate from said heat dissipating means, a valve in said receiver normally biased onto a seat to prevent such coolant flow, and a magnetic means operable when a timing period is terminated to attract said valve from its seat.

16. Apparatus according to claim 14 in which said flow control means comprises a liquid receiver connected to receive condensate from said heat dissipating means, a conical valve seat in said receiver, a ball closure for said seat and a permanent magnet movably mounted outside said receiver for movement by said initiating and terminating means to a timing position in which it does not affect said ball closure to a non-timing position in which it is moved to position to attract said ball closure from said seat.

17. Apparatus according to claim 14 in which said flow control means comprises flexible supply and discharge conduits connected to a liquid receiver and means for moving said receiver on said flexible conduits to empty into said discharge conduit or to form a liquid trap with respect thereto.

18. A toaster timer mechanism including a thermal element, means for heating said element, a heat dissipating system arranged to dissipate heat applied to said thermal element during a timing operation including a flow control means for a volatile liquid coolant connected to conduct liquid coolant into heat exchange with said thermal element, a heat dissipating element removed from the direct influence of said heating means and connected to receive coolant vapor produced by heat applied to said thermal element and to discharge condensed coolant to said flow control means, means for energizing said heating means and for operating said flow control means to prevent further flow of coolant into heat exchange with said thermal element to initiate a timing operation and means operable by said thermal element when heated to a predetermined temperature for de-energizing said heating means and for operating said flow control means to resume flow of coolant into heat exchange with said thermal element, and a current limiting resistor in series with said heating means and a thermostatic switch mechanism for short circuiting said resistor when the temperature of said timing mechanism exceeds a predetermined value.

19. A toaster timer mechanism including a thermal element, means for heating said element, a heat dissipating system arranged to dissipate heat applied to said thermal element during a timing operation including a flow control means for a volatile liquid coolant connected to conduct liquid coolant into heat exchange with said thermal element, a heat dissipating element removed from the direct influence of said heating means and connected to receive coolant vapor produced by heat applied to said thermal element and to discharge condensed coolant to said flow control means, means for energizing said heating means and for operating said flow control means to prevent further flow of coolant into heat exchange with said thermal element to initiate a timing operation, means operable by said thermal element when heated to a predetermined temperature for de-energizing said heating means and for operating said flow control means to resume flow of coolant into heat exchange with said thermal element, and an adjustable rheostat in series with said heating means for varying the heating rate thereof to vary the duration of timing periods.

20. A timing mechanism comprising; a thermal element; means for heating said element; a heat absorbing and dissipating system including, means for moving a heat absorbing medium into heat exchange relation with said thermal element to maintain the temperature of said element at a predetermined value, means for removing said medium out of heat exchange relation with said element when its temperature reaches a predetermined value and for immediately cooling the same, and means for returning such cooled heat absorbing medium into heat exchange relation with said thermal element; means for energizing said heating means and for interrupting movement of said heat absorbing medium into heat exchange relation with said thermal element to initiate a timing operation; and means operated by said thermal element when heated above said predetermined temperature to de-energize said heating means and for restoring movement of said heat absorbing medium into heat relation with said thermal element.

21. In a toaster, a timing mechanism including a thermal element, means for heating said thermal element, means operable by said thermal element when said thermal element is heated to a predetermined temperature for de-energizing said heating means to terminate a timing operation, a heat dissipating member, means for conveying a cooling medium from said heat dissipating member into heat exchange relation with said thermal element at a rate sufficient to maintain the temperature of said element below a predetermined value and thence back to said heat dissipating member, means for energizing said heating means to initiate a timing operation and for interrupting passage of cooling medium from said heat dissipating member into heat exchange relation with said thermal element during a timing operation, and means operable when said thermal element de-energizes said heating means for restoring passage of cooling medium from said heat dissipating means into heat exchange with said thermal element.

OTIS B. SUTTON.

REFERENCES CITED

The following references are of record in the file of this patent:

UNITED STATES PATENTS

| Number | Name | Date |
|---|---|---|
| 1,724,758 | Gay | Aug. 13, 1929 |
| 2,195,638 | Anderson | Apr. 2, 1940 |
| 2,198,133 | Smith | Apr. 30, 1940 |
| 2,325,551 | Scharf | July 27, 1943 |